(12) United States Patent
Poutch et al.

(10) Patent No.: US 8,546,455 B2
(45) Date of Patent: Oct. 1, 2013

(54) EXPANDED POLYSTYRENE SOLUBILIZATION METHOD

(75) Inventors: Franck Poutch, Lille (FR); Pierre Dalet, Sauternes (FR); José Alcorta, Begles (FR)

(73) Assignee: Eska, Paris (FR)

( * ) Notice: Subject to any disclaimer, the term of this patent is extended or adjusted under 35 U.S.C. 154(b) by 1024 days.

(21) Appl. No.: 10/584,888

(22) PCT Filed: Dec. 30, 2004

(86) PCT No.: PCT/FR2004/003416
§ 371 (c)(1),
(2), (4) Date: Aug. 17, 2009

(87) PCT Pub. No.: WO2005/073303
PCT Pub. Date: Aug. 11, 2005

(65) Prior Publication Data
US 2011/0021647 A1   Jan. 27, 2011

(30) Foreign Application Priority Data

Dec. 31, 2003 (FR) .................................. 03 15621

(51) Int. Cl.
*C08J 11/04* (2006.01)
(52) U.S. Cl.
USPC ............... 521/47; 521/40; 521/40.5; 521/50; 528/480; 528/493; 528/499; 528/502 R; 528/503

(58) Field of Classification Search
USPC ............. 521/40, 40.5, 47, 50–189; 528/480, 528/493, 499, 402 R, 503
See application file for complete search history.

(56) References Cited

U.S. PATENT DOCUMENTS

| 4,282,130 A * | 8/1981 | Lundberg et al. ............. 524/475 |
| 2002/0120020 A1* | 8/2002 | Usui et al. ....................... 521/47 |
| 2003/0036576 A1* | 2/2003 | Nishimoto et al. ............. 521/50 |

FOREIGN PATENT DOCUMENTS

| EP | 1 215 230 A1 | 6/2002 |
| FR | 2 417 381 A | 9/1979 |
| JP | 09 165465 A | 6/1997 |
| JP | 09157435 | 6/1997 |
| JP | 2003 145537 A | 5/2003 |
| WO | WO 99/07776 | 2/1999 |

OTHER PUBLICATIONS

Translation of Rueda (FR 2417381).*
Sherrington, "Preparation, Structure and Morphology of Polymer Supports", Chem Commm, 1998, pp. 2275-2286.*

* cited by examiner

*Primary Examiner* — Frances Tischler
(74) *Attorney, Agent, or Firm* — Browdy and Neimark, PLLC

(57) ABSTRACT

The invention relates to a method of solubilizing expanded polystyrene (EPS), in which the EPS is brought into contact with at least one initial solvent, enabling the transition of the EPS from an expanded solid state to the gel state. The aforementioned gel is subsequently treated with at least one complementary solvent that is different from the initial solvent, enabling the solubilization thereof such as to produce a true solution. The invention also relates to the product thus obtained and to the use of said product.

22 Claims, No Drawings

EXPANDED POLYSTYRENE SOLUBILIZATION METHOD

The present invention relates to an expanded polystyrene (EPS) solubilization method, allowing the recycling of the waste based on this material. This method makes use of two types of solvents: a so-called initial solvent, allowing the destructuring of the polymer and a so-called complementary solvent, allowing said polymer to be obtained in the form of a true solution. The invention also relates to a true solution based on EPS, which can be obtained by said method, and which can be used in different applications such as the formulation of adhesive, putty, sealing joints, varnish, resins, paint or lacquer.

International application WO 99/07776 describes a method for recycling and valorizing waste of expanded polymer, in particular of expanded styrene polymer of the polystyrene type and expanded styrene copolymers.

In this method, the waste of an expanded polymer is incorporated in a mixture of solvents and non-solvents, in order to obtain a pasty gel, called a magma, being characterized by a large dry extract.

More particularly, the magma is obtained by treating EPS using a treatment solution comprising a major proportion of a solvent such as acetone, a minor proportion of a non-fatty lubricant, such as glycerol, which provides a non-stick surface, and if appropriate, alcohol in a sufficient quantity to bind the solvent and the lubricant.

The magma thus formed has a reduced volume with respect to the treated EPS and a non-stick consistency making its transport and handling easy.

The method for obtaining the magma described in the international application WO 99/07776 is simple and effective. The magma obtained according to this method can be used in standard injection, extrusion or moulding methods in the plastics technology industry, as a pasty semi-finished material.

However, this magma tends to separate into two phases:
the first, at the surface, is a generally transparent mixture of liquids, called a supernatant; and
the second, below the surface, is a mass of matter which is condensed, opaque and not dissolved, the microscopic appearance of which is similar to a high-viscosity gel and the physical properties of which are characterized by a heterogeneous system. The term "gel" is understood to mean here a molecular structure in which the molecules form a three-dimensional network by strong electrostatic interactions (ionic bond or Van der Walls bond) or by cross-linking, and which results from the coagulation of a colloidal solution.

These different phases are, generally, not very miscible, even if mechanical mixing operation is carried out.

The gel, which contains polystyrene and represents the valorizable part of the magma, has an inhomogeneous appearance due to the constant state of equilibrium which exists between the solvent and the gelled polystyrene. This inhomogeneity can make its industrial transformation into products such as adhesives, paints, varnishes or lacquers difficult. In fact, in order to prepare these products, it is important to be able to fractionate the magma as many times as necessary without observing variation in its composition or in that of the products formed.

The inventors have attempted to solve this problem in order to provide an EPS recycling product, which remains homogeneous over time and which can be used for the preparation of products such as adhesives, paints, varnishes or lacquers.

According to a first subject of the invention, it relates to an EPS solubilization method, characterized in that:

i) the EPS is brought into contact with at least one initial solvent allowing the EPS to be changed from an expanded solid state to that of a gel; and ii) said gel is brought into contact with at least one complementary solvent, distinct from the initial solvent, allowing the solubilization of said gel in such a way as to obtain a true solution.

According to the invention the initial solvent and the complementary solvent can be used in the method in the order indicated or simultaneously.

By true solution is meant a homogeneous dispersion of molecules in a solvent. The true solution is not colloidal, unlike the gel which is a type of colloid in which a liquid contains a solid forming a fine network, extending in a continuous manner. According to the equilibrium which is established between the solvent and the solid, one or the other of the phases can be in excess. In the case of a true solution, by contrast, the solid phase disappears and is diluted when an excess of solvent is added.

The solubility of the polystyrene in a solvent is due to the neutralization of the forces of association between the macromolecular chains which ensure the cohesion of the polymer.

A solvent can thus be characterized by its solubility parameter, which is a measure of its internal cohesion energy density which allows it to maintain the cohesion of the molecules in the liquid phase.

The solubility parameters of the solvents are determined from the heat of vaporization and the molar volumes of said solvents with the HILDEBRAND formula, according to the following equation:

$$\sigma = [(HV-RT)/v]^{1/2}$$

where:

HV is the latent heat of vaporization (cal),

R is the ideal gas constant (1.986),

T is the temperature in °K, and

V is the molecular volume (in $cm^3$)

Its unit of measurement is usually expressed in $(cal/cm^3)^{1/2}$.

Each solvent is characterized by a specific value of $\sigma$, which can vary slightly according to the experimental data from which it is calculated. The values mentioned below are taken from the following document: Techniques de l'ingénieur, traité plastiques et composites (1997), polymères en solution, Perrin, P. and Hourdet, D.

An initial solvent and a complementary solvent according to the invention have different solubility parameters.

An initial solvent according to the invention is a solvent the solubility parameter of which is greater than the solubility parameter of EPS. Generally the initial solvent has a solubility parameter greater than 9.5 $(cal/cm^3)^{1/2}$. More generally, the solubility parameter of the initial solvent is comprised within the range 9.6 to 11.0. Such a solvent is also called a latent solvent or a diluent; it does not by itself allow the EPS to be completely dissolved.

The solvents used are preferably organic solvents produced from the refining/recycling of petroleum products or of products of vegetable origin, or produced by biotechnological processes.

The solvents shown in Table 1 below can be used as initial solvent within the meaning of the invention.

TABLE 1

| INITIAL SOLVENTS | $\delta$ in $((cal/cm^3)^{1/2})$ |
|---|---|
| Ethylene glycol monoethylene acetate | 9.6 |
| Acetone | 9.8 |
| Butyronitrile | 9.7 |
| Chlorobenzene | 9.6 |
| Chloroethylene | 9.8 |
| Methylene chloride | 9.9 |
| Cyclohexanone | 9.9 |
| Diacetone alcohol | 10.2 |
| Dioxane | 10.0 |
| Carbon disulphide | 10.0 |
| Ethyl-2-hexanol | 9.8 |
| Isophorone | 9.7 |
| n-butyl lactate | 9.7 |
| Ethyl lactate | 10.5 |
| Methylisobutylcarbinol | 9.7 |
| Methylisobutylcarbinol | 9.7 |
| Diethylene glycol monobutylether | 10.0 |
| Nitro-2-propane | 10.0 |
| o-dichlorobenzene | 10.0 |

The preferred initial solvents are butyronitrile, isophorone, n-butyl lactate, methylisobutylcarbinol, chloroethylene, ethyl-2-hexanol, methylene chloride, cyclohexanone and, more particularly, acetone.

An initial solvent of the invention is, preferably, miscible with water.

The inventors have observed that the effectiveness of the method according to the invention was determined by the quantity of residual water present on the surface of the EPS or absorbed by the EPS. It is estimated that EPS has the capacity to absorb from 5 to 50 g of water per $m^2$ of contact surface. The smaller the granulometry of the individual spheres and the more the surface of the EPS is altered by the tearing or crushing of the waste the greater is this absorption.

The absorption of water takes place at the surface and by capillarity. This results in a gradient of concentration of water on the peripheral parts of the EPS which limits the densification kinetics.

The residual water has the drawback of locally inhibiting the effectiveness of the initial solvent. The densification rate, i.e. the conversion kinetics of the EPS by the initial solvent is, for example, reduced by 50% when the initial solvent contains 1% by mass of water.

Generally, the treatment of contaminated EPS waste requires a stage of washing with a water jet in order to get rid of the organic impurities and other incrustations.

This stage can be followed by a thermal drying of the EPS, however this stage consumes energy and must be monitored closely in order to prevent localized overheating which may degrade the EPS.

With the intention of proposing a method which can be implemented in a container of reduced size such as, for example, a van which can go from one collection point to another, the inventors have envisaged various practical solutions to get rid of the residual water.

Thus, according to a preferred embodiment of the invention, the EPS solubilization method described above comprises a preliminary stage in which the EPS is washed with a solution of initial solvent containing water, for example, an acetone, ethanol or propanol solution or any other initial solvent of the invention. This solution allows elimination of the residual water at the surface or absorbed in the EPS, without modification of the EPS before treatment.

An initial solvent of the invention is therefore preferably a solvent which is miscible with water allowing the preparation of an aqueous solution of said solvent in order to wash the EPS, such as acetone.

The EPS preliminary washing solution is preferably an acetone solution containing from 5 to 40% water, more preferably 10 to 30%.

An initial solvent such as acetone ($\sigma=9.8$ $(cal/cm^3)^{1/2}$), makes it possible to subsequently obtain a true solution at a low cost in as far as the volume of initial solvent used is generally greater than the volume of complementary solvent (ratio greater than 1). Such a true solution has many advantages, among which the following may be mentioned: reduced flammability, low toxicity and at least two years' physico-chemical stability in an appropriate drum. Moreover, the use of such a solvent makes it possible for the instruments used to handle the gel obtained from EPS to be washed with water. When EPS is treated with acetone or another preferred initial solvent, the gel obtained can be left exposed to the elements without the product losing its qualities or presenting a risk to the environment.

According to another preferred embodiment of the invention, stage i) of the solubilization method consisting of bringing EPS into contact with at least one initial solvent, is carried out in the presence of an anhydrous salt allowing the residual water absorbed by the EPS or present at the surface of the EPS to be removed. Preferably, the anhydrous salt is of the calcium sulphate type. The anhydrous salt can be immersed directly in the solvent in order to dehydrate it, in particular when a solution of solvent and water has been previously used for washing the EPS, or it can be contained in cartridges through which the solvent used is circulated. This second possibility allows the recycling of the solvent, but also that of the anhydrous salt contained in the cartridge, because the cartridge can be changed and the salt that it contains dehydrated. In general, 1 to 10% anhydrous salt is added to the solvent, preferably 5 to 10%. The quantity of water collected is of the order of 0.1 to 0.4 g of water per gram of anhydrous salt.

When the complementary solvent is used after the initial solvent, its addition can take place immediately after the formation of the gel or only later, for example after transport of the gel to another industrial transformation site.

An appropriate complementary solvent for the present invention is preferably situated in the range of $\delta$ varying from 8.5 $(cal/cm^3)^{1/2}$ to 9.5 $(cal/cm^3)^{1/2}$, more preferably between 8.7 $(cal/cm^3)^{1/2}$ and 9.3 $(cal/cm^3)^{1/2}$.

The complementary solvent is preferably chosen from the ketones comprising at least 3 carbon atoms, such as methyl ethyl ketone (MEK), halogenated aliphatic compounds, such as trichloroethane, organic esters, such as ethyl acetate, or aromatic alcohols, such as phenylcarbinol.

Table 2 below shows, by way of example, a list of solvents which can be used as complementary solvents.

TABLE 2

| COMPLEMENTARY SOLVENTS | $\delta$ in $((cal/cm^3)^{1/2})$ |
|---|---|
| 1,1,1-trichloroethane | 8.6 |
| 1-chlorobutane | 8.5 |
| Amyl acetate | 8.5 |
| Methyl acetate | 9.6 |
| n-butyl acetate | 8.5 |
| Propyl acetate | 8.8 |
| Ethyl acetate | 9.1 |
| Butyric acid | 9.2 |
| Benzene | 9.1 |
| Chloroform | 9.2 |
| Cyclohexyl chloride | 9.0 |
| Cyclohexylamine | 9.0 |
| Diethyl ketone | 8.8 |
| Diethyl sulphide | 8.5 |
| Ethylbenzene | 8.8 |

TABLE 2-continued

| COMPLEMENTARY SOLVENTS | δ in ((cal/cm$^3$)$^{1/2}$) |
|---|---|
| Furan | 9.1 |
| Methylal | 8.5 |
| Methyl ethyl ketone | 9.3 |
| Methyl isoamyl ketone | 8.5 |
| Methyl isobutyl ketone | 8.6 |
| Methyl propyl ketone | 8.9 |
| Mesityl oxide | 9.2 |
| Styrene | 9.3 |
| Tetrahydrofuran | 9.5 |
| Tetralin | 9.5 |
| Toluene | 8.9 |
| Xylene | 8.8 |

The complementary solvents make it possible to obtain a good homogeneity and a satisfactory physical stability of the true solution according to the invention.

The physico-chemical characteristics of the solvents used in the context of the method of the invention are chosen so as to meet the requirements of the health and safety regulations or legislation. Thus, they are not toxic or harmful in a way that is incompatible with the technical applications envisaged.

The most appropriate complementary solvents are the following: cyclohexamine, ethyl acetate, butyric acid, chloroform, mesityl oxide, methyl ethyl ketone, 1-chlorobutane, amyl acetate, n-butyl acetate, methylal, methyl isoamyl ketone, methyl isobutyl ketone, propyl acetate, diethyl ketone, ethylbenzene and xylene.

Of these solvents, ethyl acetate is preferred.

The initial solvent generally represents between 10% and 70%, preferably between 30% and 70% of the volume of the final true solution, and the quantity of complementary solvent represents between 10% and 70%, preferably between 10% and 50% of the volume of said final true solution.

Generally, the proportion of complementary solvent represents between 1% and 30%, preferably between 15% and 30% of the volume of the initial solvent; more generally, the volume ratio between initial solvent(s) and complementary solvent(s) is greater than 1.

The quantity of EPS used for the invention is usually comprised between approximately 0.2 and 1 kg per liter of initial solvent, and preferably between 0.5 and 1 kg.

Typically, the method of the invention uses acetone as initial solvent and ethyl acetate as complementary solvent.

It can also use acetone and methyl ethyl ketone (MEK), as well as any combination of at least one initial solvent taken from the list in Table 1 with at least one complementary solvent taken from the list in Table 2, without however being limited to only these solvents.

The use of a non-fatty lubricant, such as glycerol, which was proposed in the prior patent application WO 99/07776, is not necessary for implementing the method of the present invention. In fact, such a lubricant has the drawback of considerably limiting the action of the complementary solvent and therefore the formation of a true solution. In the absence of glycerol, the method is more effective and consumes less complementary solvent, which, on an economic level, amongst other things, makes the method more advantageous.

A further subject of the present invention is a composition allowing the solubilization of EPS, which can be used for the purposes of the method of the invention.

This composition comprises:
   an initial solvent allowing the EPS to be changed from an expanded solid state to that of a gel;
   at least one complementary solvent distinct from the initial solvent, allowing the complete solubilization of said gel in such a way as to obtain a true solution.

The nature, quantities and proportions of each of the components present in this composition are such as defined previously for the purposes of the implementation of the method according to the invention.

The invention also consists of a true solution which can be obtained by the method of the invention.

This true solution is characterized in that it contains:
   polystyrene;
   an initial solvent allowing the EPS to be changed from an expanded solid state to that of a gel;
   at least one complementary solvent distinct from the initial solvent, allowing the complete solubilization of said gel in such a way as to obtain a true solution.

It is assumed that 1 kg of true solution preferably comprises between 0.2 and 0.8 kg of EPS, more preferably, between 0.3 and 0.6 kg of EPS.

The true solution can include additives, in particular a plasticizer such as those mentioned below, preferably in a proportion comprised between 5% and 20% by volume with respect to the total volume and more preferably between 10% and 15% by volume with respect to the total volume.

The true solution can also contain a tackifier, such as rosin, in a proportion which preferably varies between 10% and 20% by volume with respect to the total volume.

A true solution according to the invention can be used for preparing different products, which constitute another subject of the invention.

These products can consist of a paint, putty, sealing joints, varnish, a resin, paint, lacquer or an adhesive. In order to prepare such products the true solution of the invention is used, to which one or more additives can be added such as a colorant, a pigment, a tackifier such as rosin, a cohesion agent, such as an alcohol such as ethanol, a load for increasing the volume or a plasticizer, which may be required in order to provide the desired flexibility.

The preferred plasticizers belong to the following classes of products dialkyl phthalates, diaryl phthalates, dialkyl aryl phthalates, triaryl phosphates, triaryl alkyl phosphates and trialkyl phosphates. Examples of products of these classes which are suitable are mentioned in Table 3 below:

TABLE 3

| CLASS | TYPICAL PRODUCTS |
|---|---|
| Dialkyl phthalates | Dimethyl phthalate |
| | Diethyl phthalate |
| | Dibutyl phthalate |
| | Diisobutyl phthalate |
| | Diisooctyl phthalate |
| | Didecyl phthalate |
| | Diheptyl phthalate |
| | Dinonyl phthalate |
| | Ditridecyl phthalate |
| | Diphenyhl phthalate |
| Diaryl phthalates | Dicyclohexyl phthalate |
| Dialkyl aryl phthalates | Butylbenzyl phthalate |
| Triaryl phosphate | Tricresyl |
| | Trixylyl phosphate |
| | Diphenyl cresyl phosphate |
| | Triphenyl phosphate |
| Triaryl alkyl phosphates | Diethyl hexyl phenyl phosphate |
| Trialkyl phosphates | Tributyl phosphate |
| | Tridiethyl hexyl phosphate |

Dioctyl phthalate (DOP) is a preferred plasticizer.

The present invention also relates to the use of the true solution according to the invention for the preparation of a solid, pasty or liquid composite article.

solution of acetone in which the percentage of water was varied. This experiment was carried out in order to determine the influence of the water content of the washing solution on the rate of densification, i.e. of solubilization, of the EPS.

TABLE 4 influence of the water content in the rinsing acetone on the densification rate

| L cm | W cm | H cm | S cm$^2$ | Mass before (dry) | Mass after (wet) | ΔM (g) | | Densification time in the acetone-based solution | t/surface |
|---|---|---|---|---|---|---|---|---|---|
| 10.00 | 2.00 | 2.00 | 88.00 | 0.64 | | | control | 18 | 18 |
| 11.00 | 2.00 | 2.00 | 96.00 | 0.86 | 1.52 | 0.66 | moist control, 30 s in hard water | 71 | 64 |
| 11.00 | 2.00 | 2.00 | 96.00 | 0.79 | 1.33 | 0.54 | 30 s in hard water, rinsing-sprinkling 20 cc acetone 5% water | 32 | 29 |
| 10.00 | 2.00 | 2.00 | 96.00 | 0.87 | 1.37 | 0.50 | 30 s in hard water, rinsing-sprinkling 20 cc acetone 10% water | 30 | 27 |
| 8.00 | 2.00 | 2.00 | 88.00 | 0.97 | 1.31 | 0.33 | 30 s in hard water, rinsing-sprinkling 20 cc acetone 15% water | 55 | 55 |
| 8.00 | 2.00 | 2.00 | 72.00 | 0.58 | 1.98 | 1.40 | 30 s in hard water, rinsing-sprinkling 20 cc acetone 20% water | 55 | 68 |
| 8.00 | 2.00 | 2.00 | 72.00 | | | | 30 s in hard water, rinsing-sprinkling 20 cc acetone 30% water | 55 | 68 |
| 8.00 | 2.00 | 2.00 | 72.00 | | | | 30 s in hard water, rinsing-sprinkling 20 cc acetone 40% water | infinite | infinite |
| 8.00 | 2.00 | 2.00 | 72.00 | | | | 30 s in hard water, rinsing-sprinkling 20 cc acetone 50% water | infinite | infinite |

L, W, H: length, width, height of the volume of treated EPS

These articles prepared from the true solution can be products pasty or liquid products such as adhesives, in particular for wood and paper, varnishes, coatings, sealing joints, paints and lacquers as well as solid products in particular consisting of particle boards.

The liquid or pasty article can be a strippable product for the temporary protection of windows, hydrophobic varnishes for roofing tiles, temporary flexible joints for buildings or new adhesives.

An adhesive according to the invention can comprise a mixture of several true solutions obtained according to the method of the invention, or a true solution with an appropriate additional organic solvent.

An adhesive according to the invention can moreover contain UV-absorbing agents.

The true solution can also be used for regenerating or synthesizing a styrene-based polymer or copolymer in an expanded or non-expanded form.

The examples presented below illustrate the invention.

EXAMPLE 1

Preparation of EPS with a View to its Chemical Treatment

Used EPS boxes having served for the refrigerated transport of foodstuffs (e.g.: fish) were recovered with a view to their transformation by the solubilization method of the invention. Any heterogeneous elements surrounding it such as paper, fasteners or plastic packaging were removed, then the boxes were exposed to a water jet so as to eliminate the organic impurities and other incrustations.

As stated in the description, the residual water at the surface of the EPS or absorbed by the EPS makes the action of the initial solvent locally ineffective during the chemical conversion of EPS.

As shown in Table 4 below, tests were carried out with washing and rinsing of the boxes prepared above with a When the EPS is clean and dry (control) and the initial solvent used is acetone, the densification time is of the order of 18 seconds. When the EPS is washed in water for 30 seconds, the densification time changes to 64 seconds. If this same EPS washed in hard water is rinsed with a solution of acetone containing 5% water, the densification time is reduced to 29 seconds.

It seems therefore that a preliminary stage of washing with a solution of acetone containing water makes it possible to treat wet or dirty recovered EPS, without significantly disturbing the solubilization procedure which is to follow.

EXAMPLE 2

Transformation of the Gel into True Solution

1/Formulations and Properties of the Gel

The true solutions described below were obtained by initially solubilizing 1.33 kg of EPS washed and dried beforehand by forced air circulation at ambient temperature in 1 kg of a solution comprising 98.7% acetone and 1.3% ethanol (% V/V).

A gel having a dry extract of 57% is thus obtained, the physical and mechanical properties of which are given below:

Physical Properties

The gel is in the form of a biphasic body characterized by the existence of a first phase constituted by a transparent mixture of liquids, called a supernatant, and a second phase constituted by an opaque condensed material, without real cohesion.

Adhesive Properties

Comparative tests were carried out in order to evaluate the mechanical performances of the gel as adhesive.

For this purpose, mechanical failure tests were carried out using assemblies of substrates made of "standard" plywood brought into contact with the adhesive to be tested, which is subjected to gradual and increasing stresses. At failure, the relative displacement of the assembled parts at the time of failure is measured.

The gel was used in order to produce such an assembly with two different spreads: 150 g/m² or 300 g/m².

By way of comparison, the same protocol was applied to an assembly produced with a standard neoprene adhesive sold under the trade mark BOSTIK®. The results obtained for the two types of adhesives are shown in Table 5 below.

TABLE 5

Mechanical characteristics of the gel and of the BOSTIK ® adhesive

| Adhesive | Spread g/m² | Stress at failure (MPa) | Displacement at failure (mm) |
|---|---|---|---|
| Gel | 150 | 1.5 | 0.9 |
|  | 300 | 48 | 1.4 |
| BOSTIK | 150 | 0.3 | 1.5 |
|  | 300 | 0.3 | 1.7 |

When a spread of 150 g/m² of gel is used, the stress at failure is evaluated at approximately 1.5 MPa (N/mm²) compared with 0.3 MPa for similar assemblies produced with BOSTIK® adhesive.

The gel is therefore more resistant than the BOSTIK® adhesive (markedly higher levels of stress at failure). It is very cohesive.

However, BOSTIK® adhesive has a deformation at failure approximately two times greater than that of the gel. Compared with BOSTIK®, the gel is therefore much less flexible. The film obtained with the gel is therefore cohesive but fragile, which constitutes a constrain in the case where non-axial stresses (peeling, stretching etc.) and/or harmonic stresses (shock, vibrations etc.) are received.

2/Obtaining a True Solution

A true solution according to the invention was prepared using the gel formed in point 1/above, to which either methyl ethyl ketone (MEK), or ethyl acetate is added in proportions such that a homogeneous solution is obtained. The true solutions obtained are used in the examples below.

3/Analysis of the True Solution by Measurement of the Open Time and Ease of Coating:

The open time (or open assembly time) designates the maximum duration after coating during which the gluing is effective.

The ease of coating is dependent on the fluidity and the homogeneity of the adhesive.

In the adhesives in organic solution, the open time limit corresponds to the disappearance by evaporation of a percentage of solvent such that the film loses its tackifier properties (tack), which means that it develops no more interaction with the substrate that it is to adhere to.

During the formulation tests, ethyl acetate and MEK were incorporated into the gel as described above, as a complementary solvent, at a level of 0% to 25% of the gel volume.

Tables 6 and 7 below show the open time and the ease of coating obtained for each of the formulations.

TABLE 6

Effect of ethyl acetate

| Addition of ethyl acetate to the gel (in % vol) | Open time | Coating |
|---|---|---|
| 0 | 20 seconds | Difficult and irregular |
| 5 | 20 seconds | Perceptible improvement |
| 10 | 60 seconds | Easy and regular |
| 15 | 90 seconds | Easy and regular |
| 20 | 120 seconds | Easy and regular |
| 25 | 120 seconds | Easy and regular |

TABLE 7

Effect of MEK.

| Addition of MEK to the gel (in % vol) | Open time | Coating |
|---|---|---|
| 0 | 20 seconds | Difficult and irregular |
| 5 | 20 seconds | Difficult and irregular |
| 10 | 60 seconds | Improvement |
| 15 | 90 seconds | Easy and regular |
| 20 | 120 seconds | Easy and regular |
| 25 | 120 seconds | Easy and regular |

Because acetone is a very volatile solvent, its disappearance by evaporation when it is deposited in a thin layer is very rapid. The gel therefore has a short open time.

The results given in the Tables 6 and 7 show that when an increasing percentage of ethyl acetate (Table 6) or MEK (Table 7) is added to the acetone, in both cases, an appreciable increase in the length of the open time is observed.

The addition of complementary solvent therefore makes it possible to obtain an open time approximately 4 times greater than that obtained for the gel.

It is noted that the ethyl acetate allows an appreciable improvement in the coating with a 5% concentration of ethyl acetate, and leads to a perfect coating with a 10% concentration.

4/Measurement of Viscosity-Compatibility of the Solvents

The compatibility of a complementary solvent with the gel can be evaluated by measuring the viscosity of the true solution. The more compatible the solvent and the gel, the more the true solution obtained is fluid, with an equivalent dry extract.

Viscosity measurements were carried out using the complementary solvents MEK, ethyl acetate and trichloroethane. The measurements were carried out with a BROOKFIELD DVII+ viscometer, with mobile S64. The test was carried out at ambient temperature and at a speed of 6 rpm.

The results obtained with different volumes of solvents, are given in Table 8 below:

TABLE 8

Effect of the complementary solvents on the viscosity (in mPas.)

|  | 7% by volume | 15% by volume |
|---|---|---|
| Trichloroethane | 65 000 | 28 300 |
| MEK | Not measurable (beyond the range) | 17 200 |
| Ethyl acetate | 13 000 | 10 000 |

The results obtained show that at relatively low volumes of ethyl acetate, it is possible to obtain a true solution the viscosity of which is compatible with the production of adhesive. The quantities of MEK and trichloroethane should be much larger in order to obtain an equivalent viscosity.

EXAMPLE 3

Mechanical Properties of the True Solution

A true solution obtained using the gel of Example 1 to which 15% ethyl acetate has been added, was tested in order to determine its resistance to increasing mechanical stress, as well as its deformation at failure.

A simple shear test on two pine specimens with dimensions of 100×24×5 mm was carried out for a gluing surface of 25×24 mm$^2$, i.e. 6 cm$^2$ for a spread with a single gluing (coating on a single surface) of 300 mg.m$^{-2}$.

The same test was carried out using a vinyl adhesive marketed under the trade mark RAKOLL® 6XL-3/F-Neu.

The results of these two tensile tests at 1 mm/min$^{-1}$ on a pine specimen are shown in Table 9.

TABLE 9

Mechanical performances of the true solution

| Adhesive | Maximum stress (MPa) | % deformation at failure | Notes |
|---|---|---|---|
| True solution | 2.9 ± 0.3 | 2.8 ± 0.1 | Cohesive failure in the adhesive |
| RAKOLL ® | 2.7 ± 0.7 | 4.0 ± 0.3 | Cohesive failure in the adhesive |

For the two types of adhesive, true solution and RAKOLL® a cohesive failure is observed in the adhesive. This failure occurs for a maximum stress value situated in both cases around 2.5 MPa.

The results of the tests show that the deformation at failure is considerably improved when ethyl acetate is added to the gel. The addition of 15% ethyl acetate makes it possible to change from a deformation of 1.4% in the case of the gel alone (see example 2, i.e. without complementary solvent), to 2.8% in the case where the complementary solvent is added.

EXAMPLE 4

Addition of Plasticizers and of Tacking Resins to the True Solution

Dioctyl phthalate (DOP), was tested as additive for a true solution obtained from a gel according to Example 2 to which 12% ethyl acetate was added.

DOP is presented in the form of a liquid, the boiling point of which is 365° C. and the solidification point of which is −50° C.

The percentage of DOP in the true solution was varied.

The procedure for testing the mechanical properties of the adhesive obtained is the same as that described in Example 3.

The mechanical parameters obtained for the different formulations comprising a variable % of DOP are shown in Table 10 below.

TABLE 10

Effect of DOP on the mechanical properties of the true solution

| % by mass ethyl acetate | % by mass DOP | % by mass gel | Stress at failure (Mpa) | % deformation at failure | Notes |
|---|---|---|---|---|---|
| 12 | 8 | 80 | 2.61 ± 0.08 | 1.4 ± 0.2 | Cohesive failure of the adhesive |
| 12 | 12 | 76 | 2.31 ± 0.43 | 1.3 ± 0.2 | Complete cohesive failure |
| 12 | 13 | 75 | 1.34 ± 0.14 | 1.2 ± 0.2 | Less complete cohesive failure; good flexibility |
| 12 | 15 | 73 | 0.33 ± 0.22 | 1.2 ± 0.2 | Less complete cohesive failure; good flexibility |

Tensile test 1 mm · min$^{-1}$, on pine specimens, spread of 300 g · m$^{-2}$, with single gluing.

The results show that the addition of DOP at a level of 13% by volume of the final solution allows an increase in flexibility (less complete cohesive failure) for this type of formulation.

Similarly, it appeared that the addition of an increasing quantity of crude rosin as additive to the true solution obtained according to Example 2 by adding 24% ethyl acetate (Table 11), made it possible to reduce the mechanical resistance of the adhesive obtained. This indicates that the rosin, to a certain degree, also makes it possible to plasticize the true solution while increasing its adhesive strength.

TABLE 11

Effect of the rosin on the properties of the true solution

| % by mass ethyl acetate | % by mass crude rosin | maximum stress (Mpa) | % deformation at failure | Notes |
|---|---|---|---|---|
| 24 | 4 | 1.8 ± 0.3 | 1.0 ± 0.1 | Cohesive failure |
| 24 | 8 | 1.7 ± 0.3 | 0.9 ± 0.1 | Cohesive failure |
| 24 | 18 | 1.1 ± 0.7 | 0.7 ± 0.1 | Less complete cohesive failure |

Tensile test 1 mm · min$^{-1}$, on pine specimens, spread of 300 g · m$^{-2}$, with a single gluing.

EXAMPLE 5

Influence of Glycerol on the Obtaining of the True Solution

In the application WO 99/07776, it is stated that a non-fatty lubricant such as glycerol makes it possible to obtain a pasty magma having a non-sticky surface condition, which is advantageous with regard to the handling of said magma and its transport.

In order to evaluate the impact of the glycerol on the obtaining of the true solution by direct method (the initial solvent and the complementary solvent are used simultaneously), EPS was treated on the one hand with a composition A comprising 15% ethyl acetate, 80% acetone and 5% water and on the other hand a composition B comprising 15% ethyl acetate, 80% acetone and 5% glycerol.

Each composition was placed under stirring in a 5 liter beaker.

Rather unexpectedly, at equal viscosity, it was seen that the quantity of EPS dissolved using the composition A was clearly higher than the quantity of EPS dissolved using the solution B comprising glycerol.

A negative impact of glycerol on the effectiveness of treatment of the gel with ethyl acetate is thus observed.

EXAMPLE 6

Formulations of Products Based on True Solution

The true solution used for the preparation of the products described below comprises 85% by volume of gel as defined in Example 2 and 15% by volume of MEK.
a) Hydrophobic Varnish for Roofing Tiles
 The varnish for roofing tiles obtained by mixing:
 20% true solution;
 78% MEK;
 1.5% DOP; and
 0, 5% Tinuvin® (anti-oxidant).
b) Putty
 A putty is obtained by mixing:
 30% true solution;
 27% Hexylit® AP 422 (Clariant);
 21% load (e.g.: talc or chalk);
 14% DOP;
 4% of tackifier (e.g.: rosin ester);
 3% white colorant (e.g.: titanium oxide); and
 1% colour (commercial colorant for oil paint).
c) Flexible Polymers Suitable for Moulding and which Incorporate Different Types of Loads
 30% true solution;
 52% loads (e.g.: talc, chalk, fibres etc.)
 14% DOP;
 3% white colorant (ex: titanium oxide); and
 1% colour (commercial colorant for oil paint).
d) Particle Board Flame-Retarded without Halogen
 A particle board is obtained by mixing:
 13% true solution;
 36% particles of wood;
 9% MEK;
 40% Hexylit® APP 750 (Clariant); and
 2% of an SBS solution comprising 70% MEK and 30% Evoprène® 027.
e) Particle Board M1 Flame-Retarded with Halogen
 40% hexabromocyclododecane
 36% wood particles;
 21.6% true solution
 2.4% of an SBS solution comprising 70% MEK and 30% Evoprène® 027.
f) Strippable Protection for Windows
 A strippable protection for windows is obtained by mixing
 54% true solution;
 27% MEK;
 14% DOP;
 5% turpentine.

The invention claimed is:

1. Expanded polystyrene (EPS) solubilization method, providing the polystyrene in the form of a true solution, comprising:
 Stage i) bringing the EPS into contact with an amount sufficient of at least one initial solvent to allow the EPS to be changed from an expanded solid state to a gel having a solid phase; and
 Stage ii) bringing the gel into contact with an amount sufficient of at least one complementary solvent, distinct from the initial solvent, to solubilize said gel in such a way as to obtain a true solution in which the solid phase is disappeared,
 wherein said true solution is maintained in liquid form and recovered for immediate use or storage.

2. Method according to claim 1, wherein Stage i) and Stage ii) are carried out successively in this order.

3. Method according to claim 1, wherein the method does not include the use of a non-fatty lubricant.

4. Method according to claim 1, wherein the quantity of initial solvent represents between 10% and 70% of the volume of the true solution obtained, and the quantity of complementary solvent represents between 10% and 70% of the volume of the true solution obtained.

5. Method according to claim 1, wherein the proportion of complementary solvent represents between 1% and 30% of the volume of initial solvent.

6. Method according to claim 1, wherein the initial solvent has a solubility parameter greater than 9.5 $(cal/cm^3)^{1/2}$.

7. Method according to claim 1, wherein the initial solvent is selected from the group consisting of acetone, butyronitrile, isophorone, n-butyl lactate, methylisobutylcarbinol, chloroethylene, ethyl-2-hexanol, methylene chloride and cyclohexanone.

8. Method according to claim 1, wherein the initial solvent is acetone.

9. Method according to claim 1, wherein the complementary solvent has a solubility parameter between 8.5 $(cal/cm^3)^{1/2}$ and 9.5 $(cal/cm^3)^{1/2}$.

10. Method according to claim 1 wherein the complementary solvent is selected from the group consisting of cyclohexamine, ethyl acetate, butyric acid, chloroform, mesityl oxide, methyl ethyl ketone, 1-chlorobutane, amyl acetate, n-butyl acetate, methylal, methyl isoamyl ketone, methyl isobutyl ketone, propyl acetate, diethyl ketone, ethylbenzene and xylene.

11. Method according to claim 1, wherein the complementary solvent is ethyl acetate or methyl ethyl ketone (MEK), or a mixture of ethyl acetate and methyl ethyl ketone.

12. Method according to claim 1, wherein the initial solvent is acetone and the complementary solvent is ethyl acetate.

13. Method according to claim 1, wherein the initial solvent is acetone and the complementary solvent is methyl ethyl ketone.

14. Method according to claim 1, wherein said method comprises a preliminary stage in which the EPS is washed with a solution of initial solvent containing water.

15. Method according to claim 1, wherein Stage i) is carried out in the presence of an anhydrous salt allowing the residual water absorbed by the EPS or present at the surface of the EPS to be removed.

16. Method according to claim 15, in which the anhydrous salt is calcium sulphate.

17. Method according to claim 14, in which the solution of initial solvent for preliminary washing of the EPS is an acetone solution containing from 5 to 40% water.

18. The method of claim 4,
 wherein the quantity of initial solvent is 30-70%, and the quantity of complementary solvent is 10-50%; and
 wherein said method comprises a preliminary stage in which the EPS is washed with a solution of initial solvent containing water and in which the solution of initial solvent for preliminary washing of the EPS is an acetone solution containing from 10 to 30% water.

19. The method according to claim 1,
 wherein Stages i) and ii) are carried out simultaneous.

20. The method according to claim 1,
 wherein Stage ii) is carried out immediately after formation of the gel.

21. The method according to claim 1, further comprising Stage iii) adding into said true solution at least one additive selected from the group consisting of:
- a modifier for improving the mechanical properties of the solution;
- a tackifier;
- a cohesion agent; and
- a load for increasing the volume.

22. The method according to claim 21, wherein Stage iii) is capable of and adapted to prepare at least one product selected from the group consisting of a paint, putty sealing joints, varnish, a resin, lacquer and an adhesive.

* * * * *